United States Patent [19]

Shiau et al.

[11] Patent Number: 5,353,127
[45] Date of Patent: Oct. 4, 1994

[54] METHOD FOR QUANTIZATION GRAY LEVEL PIXEL DATA WITH EXTENDED DISTRIBUTION SET

[75] Inventors: Jeng-Nan Shiau; Zhigang Fan, both of Webster, N.Y.

[73] Assignee: Xerox Corporation, Stamford, Conn.

[21] Appl. No.: 167,758

[22] Filed: Dec. 15, 1993

[51] Int. Cl.$^5$ ............................................. H04N 1/40
[52] U.S. Cl. ................................... 358/458; 358/465
[58] Field of Search ............... 358/455, 456, 457, 458, 358/465, 466, 534, 298, 448, 447; 382/50, 52; 395/109

[56] References Cited

U.S. PATENT DOCUMENTS

| | | | |
|---|---|---|---|
| 4,339,774 | 7/1982 | Temple . | |
| 4,733,230 | 3/1988 | Kurihara et al. . | |
| 4,924,322 | 5/1990 | Kurosawa et al. | 358/448 |
| 4,955,065 | 9/1990 | Ulichney | 382/50 |
| 5,045,952 | 9/1991 | Eschbach | 358/447 |
| 5,055,942 | 10/1991 | Levien | 358/456 |
| 5,077,812 | 12/1991 | Kanno et al. | 382/50 |
| 5,226,094 | 7/1993 | Eschbach . | |
| 5,226,096 | 7/1993 | Fan | 382/50 |
| 5,243,443 | 9/1993 | Eschbach | 358/455 |
| 5,245,678 | 9/1993 | Eschbach et al. | 382/50 |

OTHER PUBLICATIONS

An Adaptive Algorithm for Spatial Greyscale, Floyd & Steinberg, Proceedings of the SID, 17/2, 75-77 (1976).
A Survey of Techniques for the Display of Continuous Tone Pictures on Bilevel Displays, Jarvis et al., Computer Graphics and Image Processing, vol. 5, pp. 13-40 (1976).
MECCA-A Multiple-Error Correction Computation Algorithm for Bi-Level Image Hardcopy Reproduction, Stucki, IBM Research RZ1060 (1981).
Images from computers, M. R. Schroeder, IEEE Spectrum, pp. 66-78 (1969).
Design of Optimal Filters for Error Feedback Quantization of Monochrome Pictures, Kim et al., Information Sciences 39, pp. 285-298 (1986).
A Simple Modification of Error Diffusion Weights, Z. Fan, IS&T's 46th Annual Conference (May 9-15, 1993).
On the Error Diffusion Technique for Electronic Halftoning, Billotet-Hoffman et al., Proceedings of the SID, vol. 24/3, pp. 253-258 (1983).

*Primary Examiner*—Scott A. Rogers
*Attorney, Agent, or Firm*—Mark Costello

[57] ABSTRACT

A method and arrangement for quantization of the nth pixel in scan line l (i.e., pixel n,l), with error diffusion to a matrix including pixels at pixel locations corresponding to pixels $\{(n+1,l), (n-2,l+1), (n-1,l+1), (n,l+1)\}$. Distribution weighting may be in accordance with the scheme $\{(n+1,l)=0.5, (n-2,l+1)=0.125, (n-1,l+1)=0.125, (n,l+1)=0.25\}$. In another embodiment, distribution weighting may be in accordance with the scheme $\{(n+1,l)=0.5, (n-3,l+1)=0.0625, (n-2,l+1)=0.0625, (n-1,l+1)=0.125, (n,l+1)=0.25, \}$.

16 Claims, 2 Drawing Sheets

| Cell = 1/16 | $I_{n,\ell}$ $\varepsilon_m$ | $I_{n+1,\ell}$ $7\varepsilon_m$ (8) |
|---|---|---|
| $I_{n-1,\ell+1}$ $3\varepsilon_m$ (2) | $I_{n,\ell+1}$ $5\varepsilon_m$ (4) | $I_{n+1,\ell+1}$ $1\varepsilon_m$ (2) |

FIG. 1
(Prior Art)

| | | Cell = 1/16 | $I_{n,\ell}$ $\varepsilon_m$ | $I_{n+1,\ell}$ $8\varepsilon_m$ |
|---|---|---|---|---|
| $I_{n-2,\ell+1}$ $2\varepsilon_m$ | $I_{n-1,\ell+1}$ $2\varepsilon_m$ | $I_{n,\ell+1}$ $4\varepsilon_m$ | $I_{n+1,\ell+1}$ $0\varepsilon_m$ | |

FIG. 3A

| | | | Cell = 1/16 | $I_{n,\ell}$ $\varepsilon_m$ | $I_{n+1,\ell}$ $8\varepsilon_m$ |
|---|---|---|---|---|---|
| $I_{n-2,\ell+1}$ $1\varepsilon_m$ | $I_{n-2,\ell+1}$ $1\varepsilon_m$ | $I_{n-1,\ell+1}$ $2\varepsilon_m$ | $I_{n,\ell+1}$ $4\varepsilon_m$ | $I_{n+1,\ell+1}$ $0\varepsilon_m$ | |

FIG. 3B

METHOD FOR QUANTIZATION GRAY LEVEL PIXEL DATA WITH EXTENDED DISTRIBUTION SET

This invention relates to conversion of images from gray scale pixel values to a reduced number of levels pixel values, using error diffusion techniques that reduce visible artifacts normally noted with error diffusion.

BACKGROUND OF THE INVENTION

Image information, be it color or black and white, is commonly derived by scanning, initially at least, in a gray level format containing a large number of levels, e.g.: 256 levels for black and white and more than 16 million ($256^3$) levels for color, which is usually unprintable by standard printers. In the following, the term "gray level" is used to described such data for both black and white and color applications. Standard printers print in a limited number of levels, either a spot or a no spot in the binary case, or a limited number of levels associated with the spot, for example, four in the quaternary case. Gray level image data may be represented in a very large number of values. Accordingly, it is necessary to reduce gray level image data to a limited number of levels, so that it is printable. Besides gray level image information derived by scanning, certain processing techniques such as those described for example in U.S. Pat. No. 5,226,094 produce gray level pixel values which require conversion to a limited set of legal, or correct output values.

One standard method of converting gray level pixel image data to binary level pixel image data is through the use of dithering or halftoning processes. In such arrangements, over a given area, each gray level pixel within the area is compared to one of a set of preselected thresholds, comprising a matrix of threshold values or a halftone cell. The effect of such an arrangement is that, for an area where the image is gray, some of the thresholds within the matrix will be exceeded, while others are not. In the binary case, the portions of the matrix, or cell elements, in which the thresholds are exceeded are printed as black, while the remaining elements are allowed to remain white. The effect of the distribution of black and white over the cell is integrated by the human eye as gray. Dithering presents problems, however, in that the amount of gray within an original image is not maintained exactly over an area, because the finite number of elements inside each halftone cell only allows the reproduction of a finite number of gray levels. The error arising from the difference between the threshold value and the actual gray level value at any particular cell is simply thrown away. This results in loss of image information. Dithering creates significant image artifacts because it ignores this error completely. A well known example is the banding or false contour artifact that can be seen in smooth image areas. Here, the image input gray level varies smoothly over an area while the halftoned image has to make a transition from one halftone dot (gray level) to another. This transition can clearly be seen as a band running through smooth image parts.

Algorithms that convert gray images to binary or other number of level images attempting to preserve gray density exist, and include among them error diffusion, as taught, for example, in "An Adaptive Algorithm for Spatial Greyscale" by Floyd and Steinberg, Proceedings of the SID 17/2, 75–77 (1976) (hereinafter, "Floyd and Steinberg"). The Floyd and Steinberg method proposes distribution of error determined in the quantization of the nth pixel in scan line 1 (i.e., pixel n,1), the matrix including pixels at pixel locations corresponding to pixels $\{(n+1, 1), (n-1,l+1), (n,l+1), (n+1,l+1)\}$. Distribution weighting in accordance with the scheme is given by $\{(n+1,l)=0.4375, (n-1,l+1)=0.1875 \ (n,l+1)=0.3125 \ (n+1,l+1)=0.0625\}$, or approximated for computer calculation by the set $\{(n+1,l)=0.5, (n-1,l+1)=0.125 \ (n,l+1)=0.25 \ (n+1,l+1)=0.125\}$ as taught in U.S. Pat. No. 4,733,230 to Kurihara. See, FIG. 1.

Other, more elaborate methods include the be the error diffusion techniques of U.S. Pat. No. 5,045,952 to Eschbach, U.S. Pat. No. 5,245,678 To Eschbach et al., U.S. Pat. No. 5,243,443 to Eschbach, U.S. Pat. No. 5, 226, 096 to Fan, U.S. patent application Ser. No. 07/800,811 by Eschbach entitled, "Halftoning with Enhanced Dynamic Range and Edge Enhanced Error Diffusion ", and U.S. patent application Ser. No. 08/065,088 by Eschbach et al. entitled, "Method for Quantization of Gray Level Pixel Data with Application of Under Compensated Error Diffusion," all assigned to the same assignee as the present invention. Additional modifications to the error diffusion algorithm taught by Floyd and Steinberg have been proposed, e.g.: a different weighting matrix, as taught, for example, in "A Survey of Techniques for the Display of Continuous Tone Pictures on Bilevel Displays" by Jarvis et al., Computer Graphics and Image Processing, Vol. 5., pp. 13–40 (1976), and in "MECCA—A Multiple-Error Correction Computation Algorithm for Bi-Level Image Hardcopy Reproduction" by Stucki, IBM Res. Rep. RZ1060 (1981). Expanded distribution sets cooperate to reduce worms, at the expense of over-enhancement of edges, more computation and stronger texture orientation in midtone regions. Modifications of the error calculation and weight allocation have been taught, for example, in U.S. Pat. No. 4,924,322 to Kurosawa et. al., U.S. Pat. No. 5,077,812 to Kanno U.S. Pat. No. 4, 339, 774 to Temple, and U.S. Pat. No. 4,955,065, to Ulichney.

Error diffusion attempts to maintain gray by making the conversion from gray pixels to binary or other level pixels on a pixel-by-pixel basis. The procedure examines each pixel with respect to a threshold, and the difference between the gray level pixel value and the threshold is then forwarded to a selected group of neighboring pixels, in accordance with a weighting scheme. The thus corrected image pixels are then considered input to the processing. In this way, the error calculated includes all errors previously made.

An alternative error diffusion procedure is taught in "Images from computers" by M. R. Schröder (sometimes spelled Schroeder) in IEEE Spectrum, pp 66–78 (1969) (hereinafter Schröder). In this method the error is only calculated between the original input pixel and the output, neglecting all previously made errors. This method leads to a poorer gray level representation than Floyd and Steinberg but to higher image contrast. Modifications to the algorithm by Schröder are taught, for example, in "Design of Optimal Filters for Error-Feedback Quantization of Monochrome Pictures" by Jung Guk Kim and Gil Kim, Information Sciences 39, pp 285–298 (1986).

In representing small variations in image appearance with an error diffusion technique, rather large areas of the image are required for the variation to be represented. Thus, while error diffusion is effective in maintaining gray over the image, it requires a rather large area of the image for the error compensation to be effective. Over such areas, undesirable textures and long range patterns, inherent in the distribution of error, may occur. These are often referred to as worms. Such artifacts particularly appear in the highlight and shadow areas of an image rendered with the original coefficient set proposed by Floyd and Steinberg.

In "A Simple Modification of Error Diffusion Weights", IS&T's 46th Annual Conference (May 9-15, 1993), one of the inventors of the present application proposed that worm creation was a result of the lack of error distribution beyond the direction of the diagonal defined by pixel (n,l) and pixel (n−1,l+1). An added distribution to (n−2,l+1) was combined with elimination of distribution to (n+1,l+1).

SUMMARY OF THE INVENTION

In accordance with the invention, there is provided a method and arrangement for quantization of the nth pixel in scan line l (i.e., pixel n,l), with error diffusion to a matrix including pixels at pixel locations corresponding to pixels {(n+1,l), (n−2,l+1), (n−1,l1), (n,l+1)}. Distribution weighting may be in accordance with the scheme {(n+1,l) =0.5, (n−2,l+1)=0.125 (n−1,l+1)=0.125 (n,l+1)=0.25}.

In accordance with the invention, gray pixel values, where the value of the pixel has one of a relatively large number of input levels, is directed through an error diffusion quantization process, for the conversion to one of a relatively small number of values. Each pixel of the gray level data is modified by a correspondingly weighted error correction term or terms from previously processed pixels, generating a modified pixel value. This modified pixel value is compared to a set of threshold values, where the comparison determines that the output will be one of a limited number of output levels. The difference value between the modified pixel value and the output pixel value is distributed in accordance with a weighted distribution scheme through a matrix comprising a set of neighboring unprocessed pixels, increasing or decreasing the gray values of such pixels, which are referred to as modified pixel values. For the nth pixel in scan line l (i.e., pixel n,l), the matrix including pixels at pixel locations corresponding to pixels {(n+1,l), (n−2,l+1), (n−1,l+1), (n,l+1)}. Distribution weighting may be in accordance with the scheme {(n+1,l) =0.5, (n−2,l+1)=0.125 (n−1,l+1)=0.125 (n,l+1)=0.25}.

In accordance with another aspect of the invention, improved results are obtained when the matrix includes pixels at pixel locations corresponding to pixels {(n+1,l), (n−3,l+1), (n−2,l+1), (n−1,l+1), (n,l+1), }. Distribution weighting may be in accordance with the scheme {(n+1,l)=0.5, (n−3,l+1)=0.0625, (n−2,l+1)=0.0625, (n−1,l+1)=0.125, (n,l+1)=0.25, }. These values are particularly useful for digital processing and implementation in hardware.

In the Floyd & Steinberg distribution set and coefficients, worms are created due to the lack of error distribution beyond the direction of the diagonal defined by pixel (n,l) and pixel (n−1,l+1). It has been discovered that relatively few weights in larger neighborhoods represented by Jarvis and Stucki contribute to the reduction of worms, while the remainder of the added weights on cause side effects. Additionally, prior error distribution neighborhoods tried to maintain symmetric distribution about an axis through the n,l pixel and the n,l+1 pixel, apparently because they viewed error distribution in a static manner. The present invention adds error passing beyond the 45 degree diagonal to pixel (n−2,l+1) or pixels (n−3,l+1) and (n−2,l+1). This effect is combined with elimination of error passing in the direction of pixel (n+1,l+1). Setting the error distribution set to a non-symmetric neighborhood recognizes that the behavior or error passing is dynamic. Accordingly, while the new weights are non-symmetric, they propagate error more evenly about the axis through the n,l pixel and the n,l+1 pixel.

These and other aspects of the invention will become apparent from the following descriptions to illustrate a preferred embodiment of the invention read in conjunction with the accompanying drawings in which:

FIG. 1 represents a prior art matrix for error diffusion weighted distribution;

FIGS. 3A and 3B represent the two error diffusion matrices in accordance with the invention.

Figure 2:
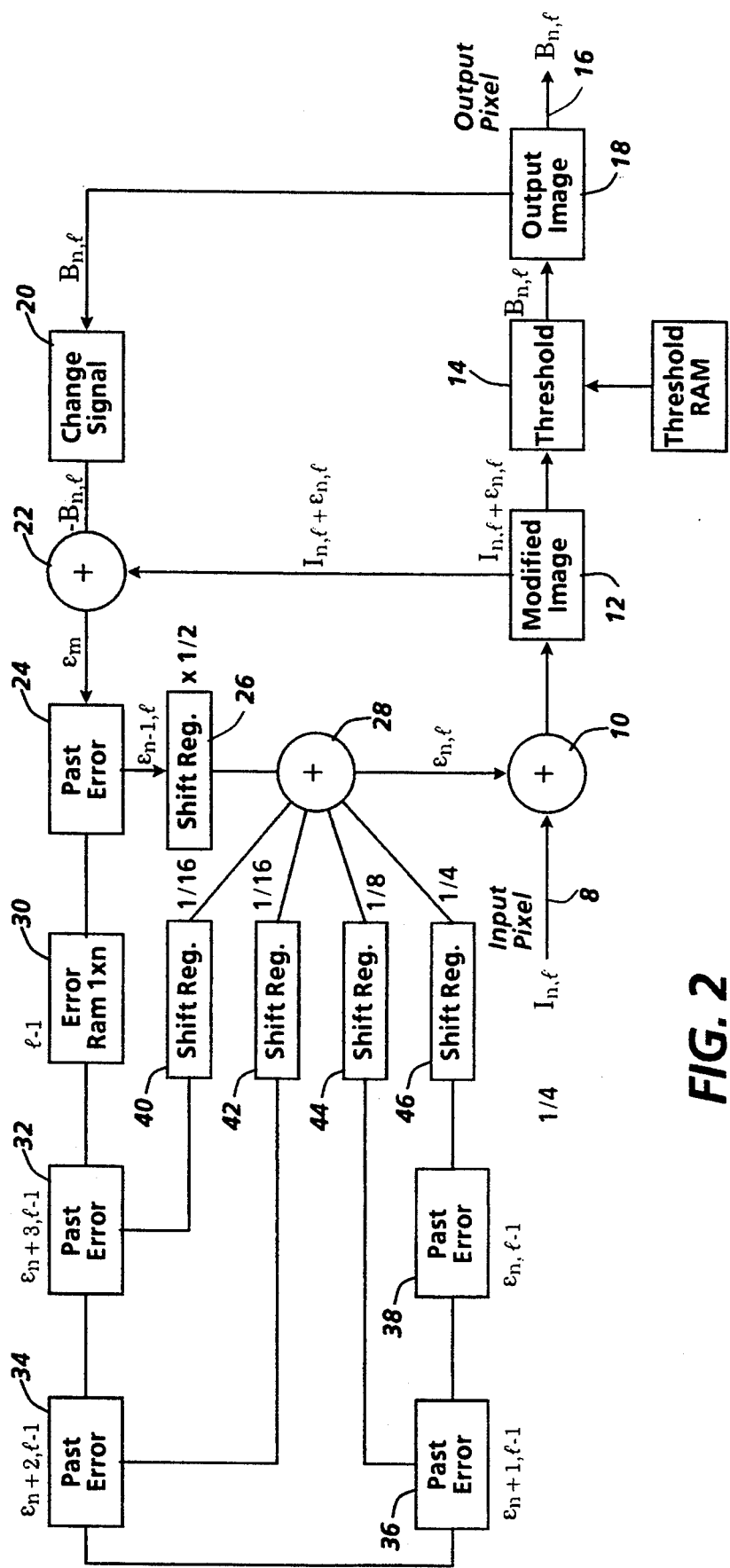
FIG. 2 is a block diagram of a basic system for carrying out one embodiment of the present invention.

Referring now to the drawings where the showings are for the purpose of describing the preferred embodiment of the invention and not for limiting same, a basic system for carrying out the present invention is shown in FIG. 2. In the present case gray level image data from image input 8 is characterized as image data, each pixel of which is defined at a single level in a set of levels, the number of members in the set of levels being larger than desired. Each pixel will be processed in the manner described hereinbelow, to redefine each pixel in terms of a new, smaller set of levels. Here, color data might be represented by a number of independent channels which are handled independently, or the color data might be represented as vectorial data in a predefined color space, e.g.: RGB, CIELab etc., being submitted to vector operations in the thresholding, error calculation and correction. One common case of this method includes the conversion of data from a relatively large set of values to a smaller set of values for printing or other display technique.

An input image of the type to be processed as hereinafter described, may be represented by a series of gray values (gray level pixels) arranged in an array of L lines, each line containing N gray value pixels. As used herein, $I_{n,l}$ refers to a particular pixel in an image at position n,l, and the gray value or intensity level of that pixel. The gray values are typically expressed as integers with one example falling in the range from 0 to 255, although greater or lesser number of levels are possible. An output image is considered to consist of pixels, each pixel corresponding to an output dot or element that is printed by a digital printer. In one embodiment that will be herein considered, image data is derived at 256 levels, and is quantized using the inventive method to one of 5 levels. Then, pulse width modulation is used to convert the 5 levels of image data to a binary output, suitable for printing with an electrostatographic or xerographic laser printing device having binary output. In electrostatographic or xerographic printing devices, the single small dots usually produced using error diffusion are not well reproduced. Using the pulse width modulation method to convert the 5 levels of image data to a binary output allows pixels to be clustered together for better print output. Other methods of quantizing the 5 levels of image data to binary levels, which take into account the values of adjacent pixels, including general dithering, may be used to produce a set of e printer output values, where, in one preferred embodiment the number of members in the set is 2. Of course, the present invention has value independent of such an additional quantization step, particularly in display technologies, and in printing technologies such as ink jet printing, where the print dot can be well reproduced.

With reference to FIG. 2, the image input 8, which may be any source of gray level image data, introduces input image I into the system on a pixel-by-pixel basis. Each input pixel has a corresponding error value $\epsilon_{n,l}$ added to the input value $I_{n,l}$ at adder 10, where $\epsilon_{n,l}$ is the sum of error values of previous pixels, resulting in a modified image, represented by modified pixel values, temporarily buffered at buffer 12. The modified image, the sum of the input value and the error value of previous pixels $(I_{n,l}+\epsilon_{n,l})$, is passed to threshold comparator 14. The modified image data is compared to threshold value(s) T, to determine an appropriate output level $B_{n,l}$ for pixel $I_{n,l}$. The threshold value(s) applied may be constant through the image or may vary either randomly, or in accordance with a dither pattern stored in RAM memory, as taught in "On the Error Diffusion Technique for Electronic Halftoning" by Billotet-Hoffmann and Bryngdahl, Proceedings of the SID, Vol. 24/3, (1983), pp. 253–258, or in accordance with input information U.S. Pat. No. 5,045,952 to Eschbach, output information as described in U.S. Pat. No. 5,055,942 to Levien or in accordance with any other predetermined variation. Once output level $B_{n,l}$ is determined and directed to output image storage 16 for eventual transfer to an output along line 18, the value of $B_{n,l}$ is subtracted from the modified image value $(I_{n,l}+\epsilon_{n,l})$ to generate the quantization error level $\epsilon_m$ from quantizing pixel $(I_{n,l}+\epsilon_{n,l})$. The subtraction operation is represented by the change sign block 20 and subsequent adder 22, with $\epsilon_m$ representing the difference between the modified image value $(I_{n,l}+\epsilon_{n,l})$ and the output value $B_{n,l}$ for pixel $I_{n,l}$. Error term $\epsilon_m$ is then distributed. For the nth pixel in scan line l (i.e., pixel n,l), the distribution matrix as shown in FIG. 3, includes pixels at pixel locations corresponding to pixels $\{(n+1,l), (n-2,l+1), (n-1,l+1), (n,l+1)\}$. Distribution weighting may be in accordance with the scheme $\{(n+1,l)=0.5, (n-2,l+1)=0.125(n-1,l+1)=0.125 (n,l+1)=0.25\}$ in a second embodiment, improved results are obtained when the matrix includes pixels at pixel locations corresponding to pixels $\{(n+1,l), (n-3,l+1), (n-2,l+1), (n-1,l+1), (n,l+1)\}$. Distribution weighting may be in accordance with the scheme
$\{(n+1,l)=0.5,$      $(n-3,l+1)=0.0625,$
$(n-2,l+1)=0.0625,$      $(n-1,l+1)=0.125,$
$(n,l+1)=0.25,\}$.

With reference again to FIG. 2, the invention is illustrated somewhat differently, showing the contribution of error to a single pixel n,l to be processed. Described will be the error passing arrangement of FIG. 3B. Accordingly, error $\epsilon_m$ is initially stored at past error buffer 24. From past error buffer 24, error am is directed to shift register 26, which shifts the binary value representing the error a number of places corresponding to multiplication by 0.5. The resultant error contribution is directed to adder 28. A scan line of errors $\epsilon_m$ is temporarily stored at error RAM 30. At an appropriate time, error from scan line l—1 appropriate for distribution to a pixel passing at adder 10 is loaded from RAM 30 into past error buffer 32, and shifted with the same clocking that each pixel is shifted into adder 10, to past error buffers 34, 36, and 38. Weighted portions of error $\epsilon_m$ stored at each of these past error buffers, representing the contribution from pixels to $\epsilon_{n,l}$ is added so that at adder 28, for pixel n,l, error from the evaluation of pixels $(n,l-1)$, $(n+1,l-1)$, $(n+2,l-1)$, $(n+3,l-1)$ are added at adder 28 to error from $(n-1,l)$ to derive error $\epsilon_{n,l}$.

Shift registers 40, 42, 44 and 46, respectively corresponding to past error buffers 32, 34, 36 and 38 are available to provide a bit shifting arrangement which shifts the binary value representing the error a number of places corresponding to multiplication by 0.0625, 0.0625, 0,125 and 0.25 respectively.

The distribution set of FIG. 3A is implemented in generally the same way, with the exception that past error buffer 32 and the corresponding shift register 40 may be removed, and shift register 42 is altered to provide a multiplication by 0.125.

It will no doubt be appreciated that the present invention may be accomplished with either software, hardware or combination software-hardware implementations.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

We claim:

1. A method of quantizing pixel values, in which an image is formed by a plurality of pixels, each pixel representing an optical density of the image at a location within the image, and having an original optical density value associated therewith selected from one of a set of original optical density values, having number of members larger than a desired output set of optical density values, the steps comprising:

adding to each pixel an error resulting from quantization of previous pixels, if any, to derive a modified optical density value;

comparing the modified optical density value of an $n^{th}$ pixel in a scan line l (n,l) with a threshold to select an output values representing the pixel;

determining an error term that is a difference between the output value and the modified optical density value;

distributing a weighted portion of the error term, to a preselected plurality of pixels, including pixels at positions $(n+1,l)$, $(n-2,l+1)$, $(n-1,l+1)$, $(n,l+1)$.

2. The method as described in claim 1, wherein the weighting of each weighted portion corresponds to: $(n+1,l)=0.5$; $(n-2,l+1)=0.125$; $(n-1,l+1)=0.125$; and $(n,l+1)=0.25$.

3. The method as described in claim 1, wherein the preselected plurality of pixels additionally includes pixel $(n-3,l+1)$.

4. The method as described in claim 3, wherein the weighting of each weighted portion corresponds to:
$(n+1,l)=0.5;$      $(n-3,l+1)=0.0625;$
$(n-2,l+1)=0.0625;$      $(n-1,l+1)=0.125;$
$(n,l+1)=0.25.$ 5. A method of preparing an electronic document for printing at a printer adapted to printing n level spots for each pixel, the steps comprising:

receiving a document defined in terms of digital electronic input signals, each signal having a magnitude selected from one of m levels (where m is greater than n) and corresponding to a pixel;

adding to each input signal an error signal resulting from quantization of previous signals, if any, to derive a modified input signal;

comparing the modified input signal of an $n^{th}$ pixel in scan line 1 (n,l) with a threshold to select as an output response from the printer, one of the n level spots;

determining an error term that is a difference between the output response and the modified input for the $n^{th}$ pixel in scan line 1 (n,l);

storing the error term;

distributing a weighted portion of the error term, to a preselected plurality of input signals, including signals representing density in the document at positions (n+1,l), (n−2,l+1), (n−1,l+1), (n,l+1).

6. The method as described in claim 5, wherein the weighting of each weighted portion corresponds to:
(n+1,l)=0.5; (n−2,l+1)=0.125; (n−1,l+1)=0.125; and (n,l+1)=0.25.

7. The method as described in claim 5, wherein the preselected plurality of pixels additionally includes pixel (n−3,l+1).

8. The method as described in claim 7, wherein the weighting of each weighted portion corresponds to:
(n+1,l)=0.5; (n−3,l+1)=0.0625;
(n−2,l+1)=0.0625; (n−1,l+1)=0.125;
(n,l+1)=0.25.

9. A method of quantizing pixel values, in which an image is formed by a plurality of pixels, each pixel representing an optical density of the image at a location therewithin, and having an original optical density value associated therewith selected from one of a set of original optical density values, having number of members n larger than a desired output set of optical density values, the steps comprising:

adding to an input density value of each pixel an error signal resulting from quantization of previous pixels, if any, to derive a modified density value;

comparing the modified density value of an $n^{th}$ pixel in a scan line 1 (n,l) with a threshold to select an output value representing the pixel from a set of m possible density value;

determining an error term that is a difference between the output value and the modified density value;

distributing a weighted portion of the error term, to a preselected plurality of pixels including a pixels representing density at (n+1,l), and pixels in the next scan line at pixel positions less than n.

10. The method as described in claim 9, wherein the weighting of each weighted portion corresponds to:
(n+1,l)=0.5; (n−2,l+1)=0.125; (n−1,l+1)=0.125; and (n,l+1)=0.25.

11. The method as described in claim 9, wherein the preselected plurality of pixels additionally includes pixel (n−3,l+1).

12. The method as described in claim 11, wherein the weighting of each weighted portion corresponds to:
(n+1,l)=0.5; (n−3,l+1)=0.0625;
(n−2,l+1)=0.0625;(n−1,l+1)=0,125;
(n,l+1)=0.25.

13. Apparatus for preparing an electronic document for printing at a printer adapted to printing n level spots for each pixel, the steps comprising:

a document input receiving document images defined in terms of digital electronic input signals, each signal having a magnitude selected from one of m levels (where m is greater than n) and corresponding to a pixel and describing density of the document at position n in a scan line 1 (n,l);

a summing circuit, adding to each input signal an error signal resulting from quantization of previous signals, if any, to derive a modified input signal;

a comparator, operatively connected to said document input to receive the modified input signals and to a source of threshold signals, and producing an output response selected from one of the n level spots upon comparing each modified input signal with a threshold signal;

a difference circuit receiving as inputs the output response and the modified input signals and deriving an digital electronic error term signal representing the difference in density between the output response and the modified input signal;

a first error term buffer and a corresponding shift register operatively connected to said difference circuit, receiving an error term from quantization of signal (n−1,l) therefrom and shifting the error term for addition of a weighted portion thereof at said summing circuit to input signal n in scan line 1 (n,l);

a line buffer operatively connected to the first error term buffer, storing a line of error term signals corresponding to signals in scan line l−1;

at least second, third and fourth error term buffers, each having a corresponding shift register, and operatively connected to said line buffer, to receive error terms from the quantization of signals at positions (n,l−1), (n+1,l−1), (n+2,l−1) each shift register shifting the error term for addition of a weighted portion thereof at said summing circuit to input signal n in scan line 1 (n,l).

14. The apparatus as described in claim 13, wherein the weighted portions of the error term from positions (n,l−1), (n+1,l−1), (n+2,l−1) corresponds to:
(n−1,l)=0.5; (n+2,l−1)=0.125; (n+1,l−1)=0.125; and (n,l−1)=0.25.

15. The apparatus as described in claim 13, including a fifth error term buffer and corresponding shift register, and operatively connected to said line buffer, to receive error terms from the quantization of a signal at position (n+3, l−1), each shift register shifting the error term for addition of a weighted portion thereof at said summing circuit to input signal n in scan line 1 (n,l).

16. The apparatus as described in claim 15, wherein the weighting of each weighted portion corresponds to:
(n−1,l)=0.5; (n+3,l−1)=0.0625;
(n+2,l−1)=0.0625; (n+1,l−1)=0.125;
(n,l−1)=0.25.

* * * * *